US011298809B1

(12) United States Patent
Lomsak

(10) Patent No.: US 11,298,809 B1
(45) Date of Patent: Apr. 12, 2022

(54) ARTICULATED SEAL PULLER SYSTEM

(71) Applicant: Michael J. Lomsak, Plant City, FL (US)

(72) Inventor: Michael J. Lomsak, Plant City, FL (US)

( * ) Notice: Subject to any disclaimer, the term of this patent is extended or adjusted under 35 U.S.C. 154(b) by 0 days.

(21) Appl. No.: 15/217,000

(22) Filed: Jul. 22, 2016

(51) Int. Cl.
*B23P 19/02* (2006.01)
*B25B 27/00* (2006.01)
*B25B 27/06* (2006.01)

(52) U.S. Cl.
CPC .......... *B25B 27/0028* (2013.01); *B25B 27/06* (2013.01)

(58) Field of Classification Search
CPC ............................ B25B 27/0028; B25B 27/06
USPC ..... 29/235, 247, 255, 275; 81/463, 466, 478
See application file for complete search history.

(56) References Cited

U.S. PATENT DOCUMENTS 1,531,732 A * 3/1925 Burkholder ............. B66F 13/00 74/547
4,211,446 A * 7/1980 Shultz, Sr. .......... B25B 27/0028 254/131
4,476,861 A * 10/1984 Dimakos ................ A61B 17/92 29/255
6,837,481 B1 * 1/2005 Corral ....................... E03B 9/02 251/293
6,880,217 B2 * 4/2005 Garst .................. B25B 27/0028 29/235
2003/0135969 A1 * 7/2003 Darling ................... B25B 27/02 29/235

* cited by examiner

*Primary Examiner* — Joseph J Hail
*Assistant Examiner* — Shantese L McDonald
(74) *Attorney, Agent, or Firm* — GrayRobinson, P.A.; Michael J. Colitz, III

(57) ABSTRACT

A tool is formed of an upper component and a lower component. An intermediate component is formed of a first plate and a parallel second plate. The first plate and the second plate span the lower end of the upper component forming an upper pivot point and span the upper end of the lower component forming a lower pivot point. A foot is integrally formed with and extends r the lower component. A handle is formed of a cross piece with a central extent from the lower component adjacent to the lower end of extent central extent being attached to the upper end of the upper component.

1 Claim, 4 Drawing Sheets

ARTICULATED SEAL PULLER SYSTEM

BACKGROUND OF THE INVENTION

Field of the Invention

The present invention relates to an articulated seal puller system and more particularly pertains to pulling a failed seal of a lubrication assembly, seals normally functioning to keep lubricant in and dirt out of a lubricating location. The pulling of the seal is done in a safe, convenient, and economical manner.

Description of the Prior Art

The use of seal puller systems of known designs and configurations is known in the prior art. More specifically, seal puller systems of known designs and configurations are known to consist basically of familiar, expected, and obvious structural configurations, notwithstanding the myriad of designs encompassed by the crowded prior art which has been developed for the fulfillment of countless objectives and requirements.

While known devices fulfill their respective, particular objectives and requirements, they do not describe an articulated seal puller system that allows inserting a seal puller into a lip of a seal in tight areas while exerting a grasping force greater than prior seal pullers. The seal puller of the present invention is articulated, functioning to straighten out the seal puller and hook into the seal in a single move.

In this respect, the articulated seal puller system according to the present invention substantially departs from the conventional concepts and designs of the prior art, and in doing so provides an apparatus primarily developed for the purpose of pulling a seal of a lubrication assembly and for keeping lubricant in and dirt out of a lubricating location.

Therefore, it can be appreciated that there exists a continuing need for a new and improved articulated seal puller system which can be used for pulling a failed seal of a lubrication assembly.

SUMMARY OF THE INVENTION

In view of the disadvantages inherent in the known types of seal puller systems of known designs and configurations now present in the prior art, the present invention provides an improved articulated seal puller system. As such, the general purpose of the present invention, which will be described subsequently in greater detail, is to provide a new and improved articulated seal puller system and method which has all the advantages of the prior art and none of the disadvantages.

To attain this, from a broad perspective, the present invention essentially comprises a tool formed of an upper component and a lower component. An intermediate component is formed of a first plate and a parallel second plate. The first plate and the second plate span the lower end of the upper component forming an upper pivot point. The first plate and the second plate span the upper end of the lower component forming a lower pivot point. A foot is integrally formed with and extends radially from the lower component adjacent to the lower end of the lower component. A handle is formed of a cross piece with a central extent attached to the upper end of the upper component.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining the primary embodiment and an alternate embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved articulated seal puller system which has all of the advantages of the prior art seal puller systems of known designs and configurations and none of the disadvantages.

It is another object of the present invention to provide a new and improved articulated seal puller system which may be easily and efficiently manufactured and marketed.

It is a further object of the present invention to provide a new and improved articulated seal puller system which is of durable and reliable construction.

An even further object of the present invention is to provide a new and improved articulated seal puller system which is susceptible of a low cost of manufacture with regard to both materials and labor, and which accordingly is then susceptible of low prices of sale, thereby making such articulated seal puller system economically available.

Lastly, it is an object of the present invention to provide an articulated seal puller system for pulling a seal of a lubrication assembly.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which the preferred and an alternate embodiment of the invention are illustrated.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
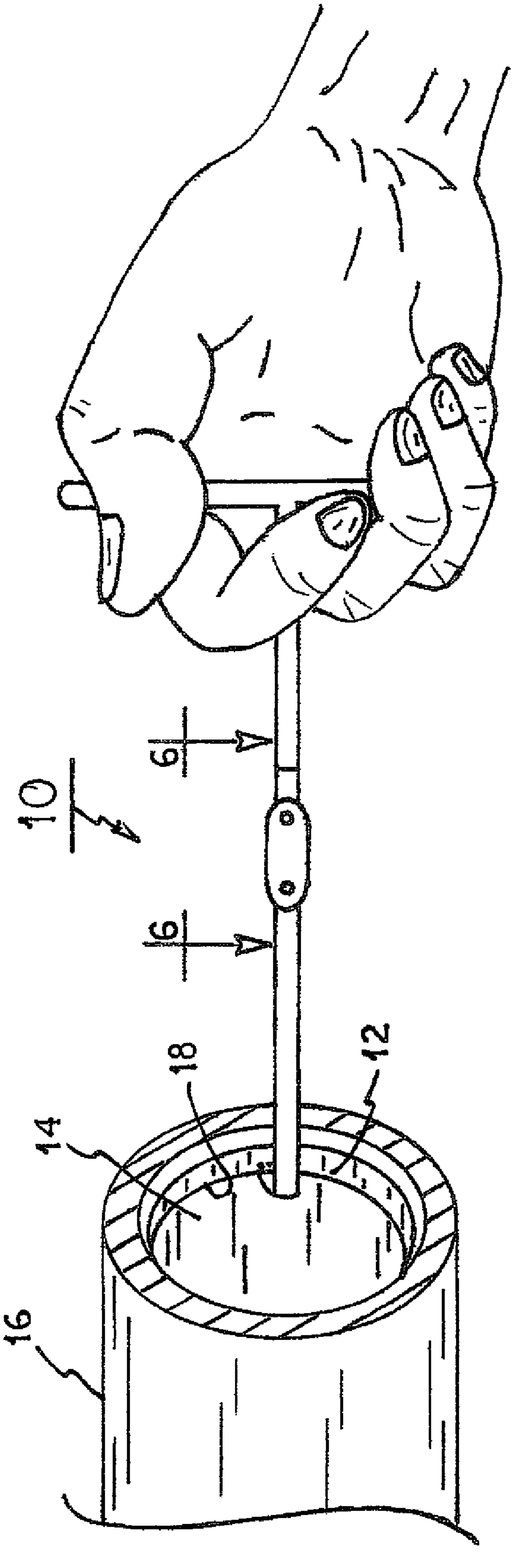
FIG. 1 is a perspective illustration of an articulated seal puller system constructed in accordance with the principles of the present invention, the system being shown pulling a seal on an exterior rigid cylinder, an interior axle not being shown.
Figure 2:
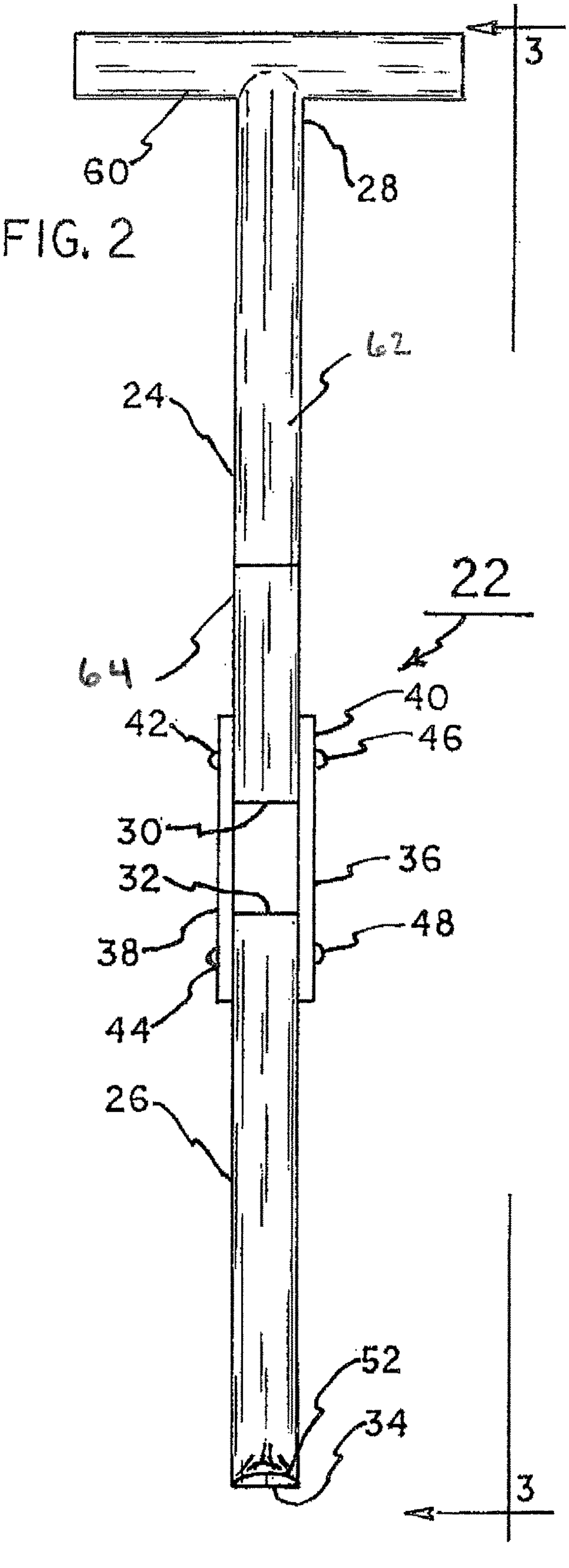
FIG. 2 is a front elevational view of the articulated seal puller system shown in FIG. 1.
Figure 3:
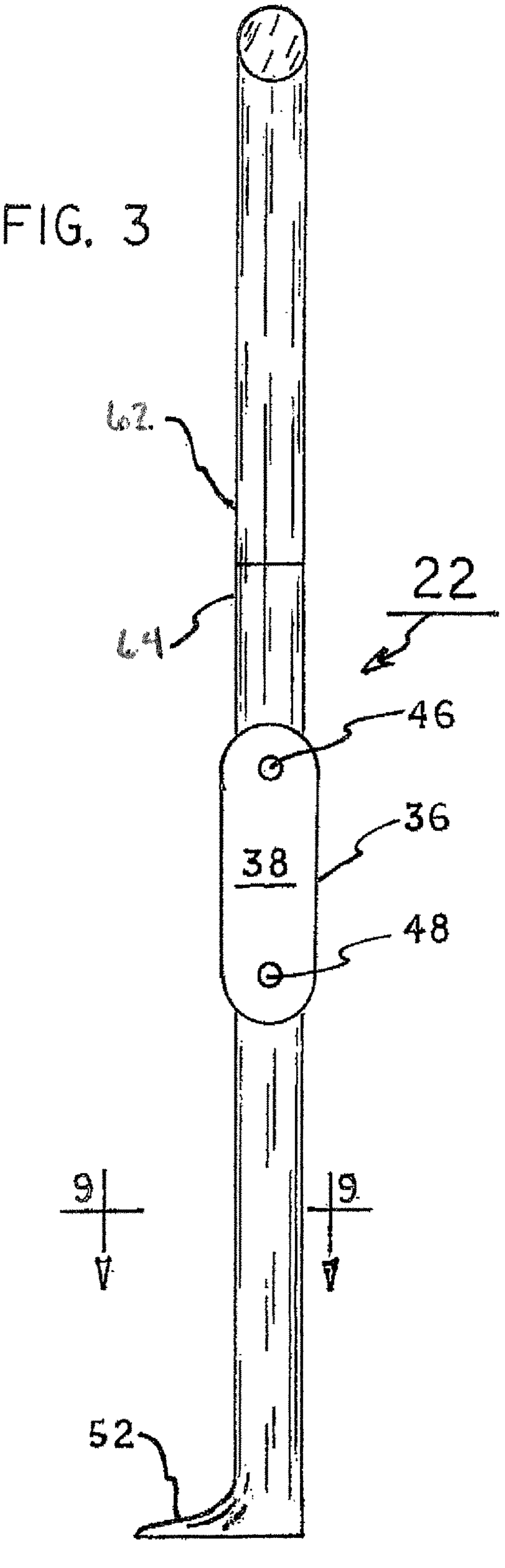
FIG. 3 is a side elevational view of the system taken along line 3-3 of FIG. 2.
Figure 5:
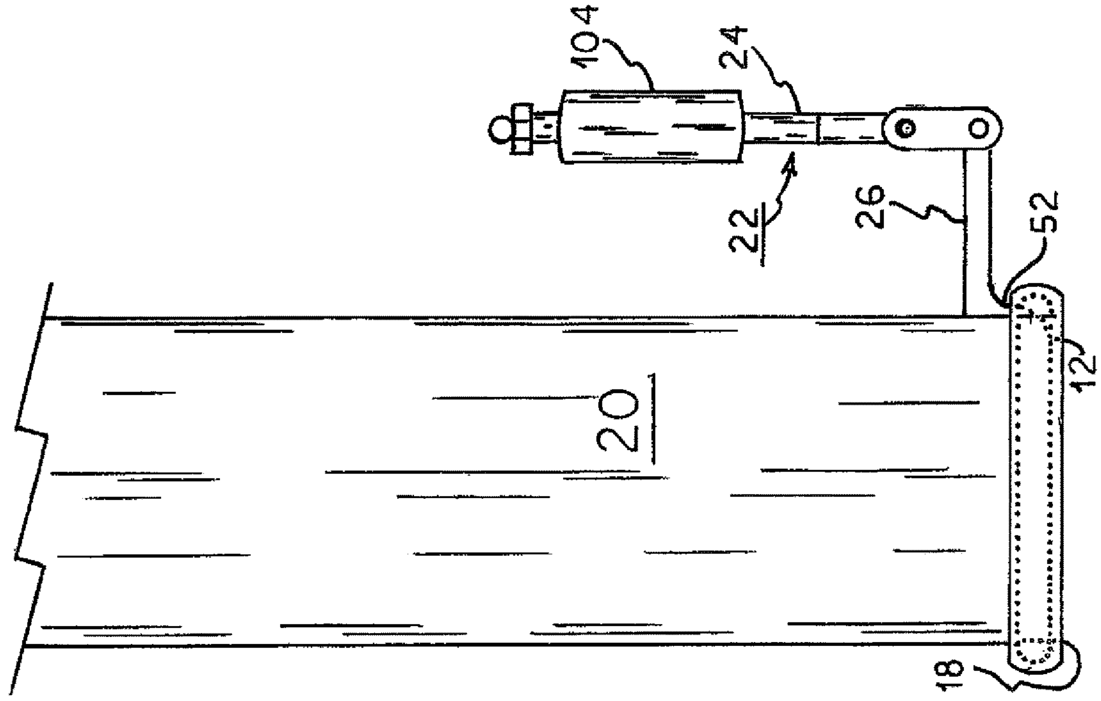
FIG. 5 is an enlarged side elevational view of the lower extent of the system shown in FIGS. 1 and 4 constructed in accordance with an alternate embodiment of the invention.
Figure 4:
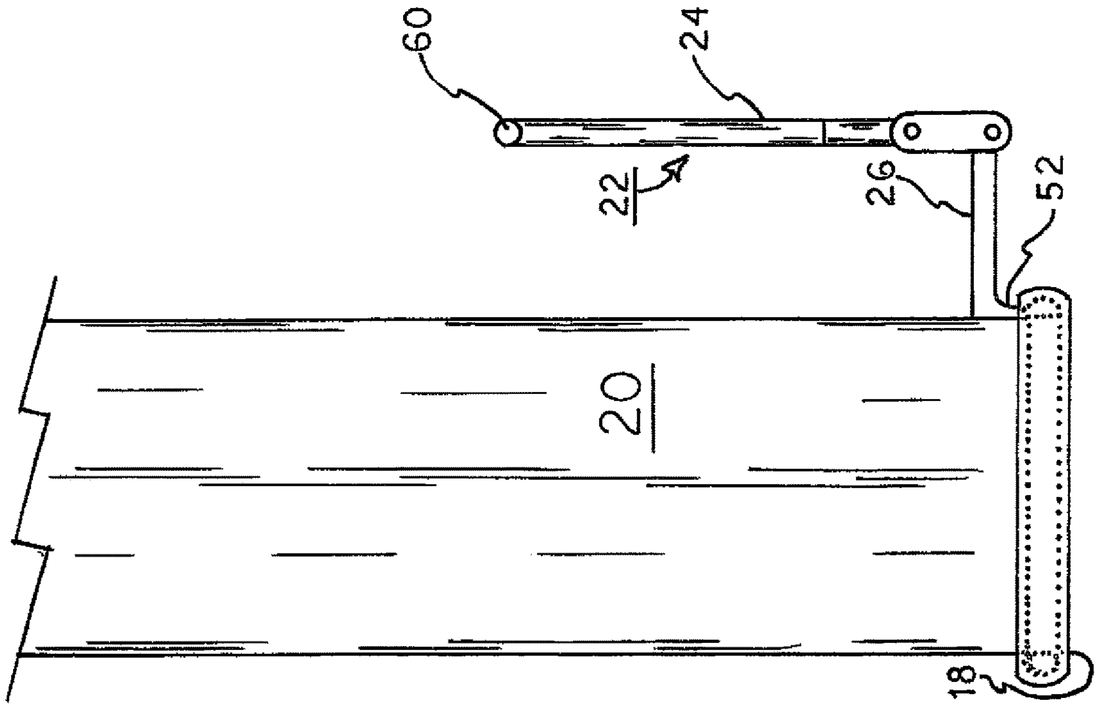
FIG. 4 is an enlarged side elevational view of the lower extent of the system shown in FIG. 1, the system being shown pulling a seal on an interior axle, an exterior cylinder not being shown.
Figure 8:
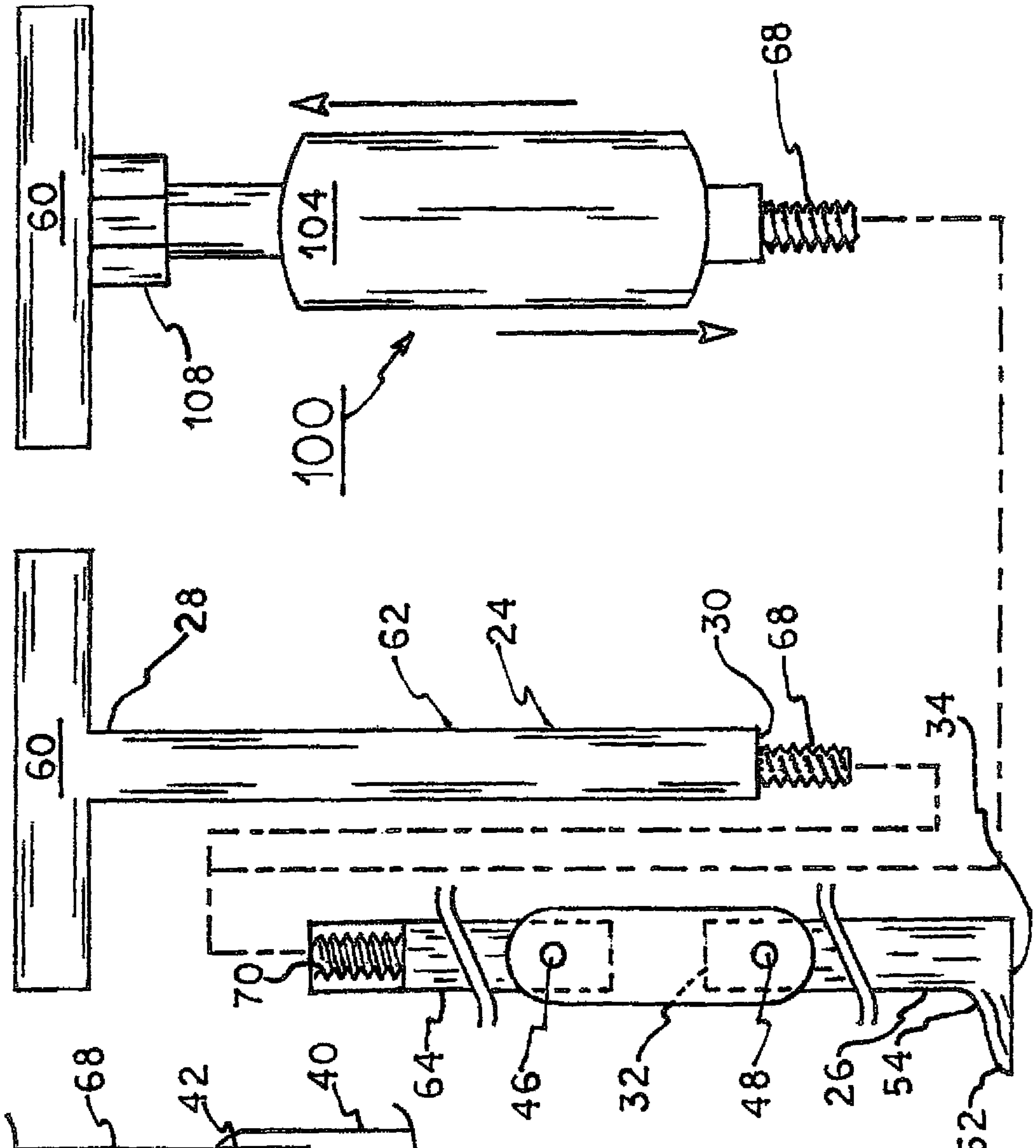
FIG. 8 is an exploded side elevational view illustrating the lower component adapted to be coupled to the upper component of the primary and also illustrating an alternate embodiment of the invention.
Figure 7:
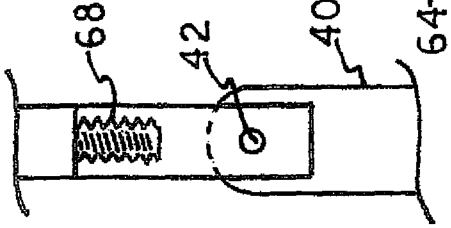
FIG. 7 is a cross sectional view of the system taken along line 7-7 of FIG. 6.
Figure 6:
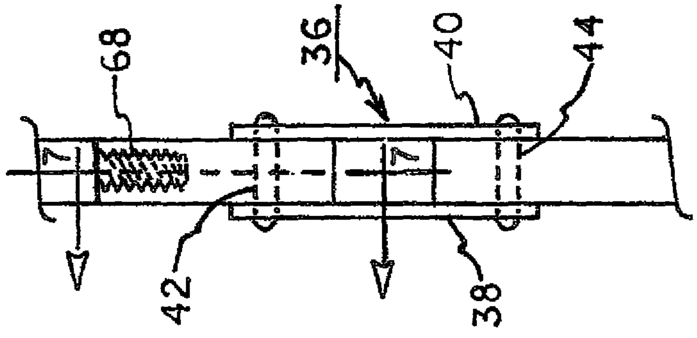
FIG. 6 is an enlarged front elevational view of the central extent of the system taken along line 6-6 of FIG. 1.
Figure 9:
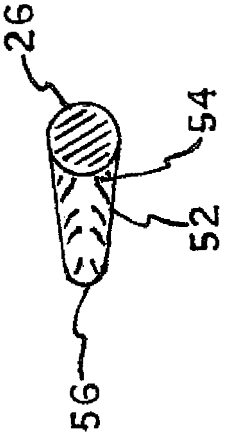
FIG. 9 is a cross sectional view taken along line 9-9 of FIG. 3.

With reference now to the drawings, and in particular to FIG. 1 thereof, the preferred embodiment of the new and improved articulated seal puller system embodying the principles and concepts of the present invention and generally designated by the reference numeral 10 will be described.

The present invention, the articulated seal puller system 10 is comprised of a plurality of components. Such components in their broadest context include a tool, a foot, and a handle. Such components are individually configured and correlated with respect to each other so as to attain the desired objectives.

From a specific perspective, the invention of the present application is an articulated seal puller system 10 for pulling a failed seal 12 of a lubrication assembly. Such a seal, in the disclosed embodiment, fills an opening 14 between a rigid cylinder 16 and an axle 20. The pulling of the seal is done in a safe, convenient, and economical manner. Although the present invention is disclosed as a seal puller, it should be appreciated that the puller of the present invention is capable of pulling bearings and bushings and the like pressed in a recess or on a shaft.

First provided in the preferred embodiment is a lubrication assembly. The lubrication assembly includes an axle 20 and a rigid cylinder 16 with the seal 12 there between. The lubrication assembly also includes the opening 14 at the end of the rigid cylinder. Interfaces 18 are formed between the seal and both the rigid cylinder and the axle. The seal is fabricated with a surface of an elastomeric material.

Next provided is a tool 22 formed of an upper component 24 and a lower component 26. The upper component has an upper end 28 and a lower end 30. The lower component has an upper end 32 and a lower end 34. An intermediate component 36 is provided. The intermediate component is formed of a first plate 38 and a parallel second plate 40. The first plate and the second plate span the lower end of the upper component. The first plate and the second plate span the upper end of the lower component. An upper aperture 42 extends through the first plate and the upper component and the second plate. A lower aperture 44 extends through the first plate and the lower component and the second plate. An upper pin 46 and a lower pin 48 are provided. The upper pin 46 extends through the upper aperture. The lower pin 48 extends through the lower aperture. The upper pin and the lower pin are separated by 0.50 inches, plus or minus 10 percent, and the upper component and the lower component are separated by 0.125 inches, plus or minus 10 percent, when the upper component and the lower component are axially aligned.

A foot 52 is next provided. The foot is integrally formed with the lower component adjacent to the lower end of the lower component. The foot has a flat lower face coextensive with the lower end of the lower component. The foot has a curved upper face. The foot has an inner end 54 with a radius of curvature equal to the radius of curvature of the lower component. The foot has an outer end 56 in a semi-circular configuration with a radius of curvature less than the radius of curvature of the inner end. The inner end of foot has a first height. The outer end of foot has a second height which is less than the first height.

Next provided is a handle 60. The handle is formed of a cross piece with a central extent. The central extent is attached to the upper end of the upper component.

The upper component is formed of a top section 62 and a bottom section 64. The top section 62 terminates below with downwardly extending male screw threads 68. The bottom section 64 terminates above with an upwardly facing recess with female screw threads 70. The downwardly extending male screw threads and the upwardly facing female screw threads are adapted to facilitate coupling prior to operation and use and to facilitate uncoupling prior to storage and transportation.

In an alternate embodiment of the system 100, a weight 104 is provided. The weight is slidably mounted on the upper component. The weight is adapted to be reciprocated by a user to apply a repeating upward force to the tool at the handle. In this embodiment, the system also includes a spacer 108 on the upper component adjacent to the handle to preclude unintended striking of a user's fingers during use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An articulated seal puller system (10) for pulling a seal (12) of a lubrication assembly for lubricating purposes, the lubrication assembly including an axle (20) and a rigid cylinder (16) with the seal (12) there between, the system (10) comprising, in combination:

the lubrication assembly including the opening (14) at the end of the rigid cylinder (16) with the seal (12) creating interfaces (18) between the seal (12) and both the rigid cylinder (16) and the axle (20), the seal (12) being fabricated with a surface of an elastomeric material;

a tool (22) formed of an upper component (24) and a lower component (26), the upper component (24) having an upper end (28) and a lower end (30), the lower component (26) having an upper end (32) and a lower end (34), an intermediate component (36) consisting of a planar first plate (38) and a planar parallel second plate (40), the first plate and the second plate spanning the lower end (30) of the upper component (24) and the upper end (32) of the lower component (26), an upper aperture (42) extending through the first plate and the second plate, a lower aperture (44) extending through the first plate and the second plate, an upper pin (46) extending through the upper aperture, a lower pin (48) extending through the lower aperture, the upper pin and the lower pin being separated by 0.50 inches, plus or minus 10 percent, the upper component (24) and the lower component (26) being separated by 0.125 inches, plus or minus 10 percent, when the upper component (24) and the lower component (26) are axially aligned;

a foot (52) formed integrally with the lower component (26) adjacent to the lower end (34) of the lower component (26), the foot (52) extending radially outwardly from the lower component (26), the foot (52) extending linearly perpendicular to the upper pin and the lower pin, the foot having a flat lower face coextensive with the lower end (34) of the lower component (26), the foot (52) having a curved upper face, the foot (52) having an inner end (54) with a radius of curvature equal to the radius of curvature of the lower component (26), the foot having an outer end (56) in a semi-circular configuration with a radius of curvature less than the radius of curvature of the inner end (54), the inner end (54) of the foot (52) having a first height, the outer end (56) of foot (52) having a second height less than the first height;

a handle (60) formed of a cross piece with a central extent, the central extent being attached to the upper end (28) of the upper component (24); and a slide hammer formed as a weight (104) slidably mounted on the upper component (24), the weight (104) adapted to be reciprocated by a user to apply a repeating upward force to the tool (22), the tool (22) also including a spacer (108) on the upper component (24) adjacent to the handle (60) to preclude unintended striking of a user's fingers during use; and the upper component (24) being formed of a top section (62) and a bottom section (64), the top section (62) terminating below with downwardly extending male screw threads (68), the bottom section (64) terminating above with an upwardly facing recess with female screw threads (70), the downwardly extending male screw threads (68) and the upwardly facing female screw threads (70) adapted to facilitate coupling prior to operation and use, and adapted to facilitate uncoupling prior to storage and transportation, the weight (104) being slidable over the top and bottom sections (62, 64) of the upper component (24).

* * * * *